United States Patent [19]

Keritsis

[11] Patent Number: 4,829,862
[45] Date of Patent: May 16, 1989

[54] MODULAR LOCKING SYSTEM
[75] Inventor: George Keritsis, Knoxville, Tenn.
[73] Assignee: Carboloy Inc., Warren, Mich.
[21] Appl. No.: 86,498
[22] Filed: Aug. 17, 1987
[51] Int. Cl.⁴ .............................................. B23B 5/22
[52] U.S. Cl. ................................. 82/158; 82/DIG. 9; 82/904; 279/67; 409/232; 408/239 R; 408/240
[58] Field of Search .................. 82/36 R, 31, DIG. 9; 408/239 R, 239 A, 240; 409/232, 234; 279/66, 67, 79

[56] References Cited
U.S. PATENT DOCUMENTS
2,485,799 10/1949 Woytych ............................ 279/67

FOREIGN PATENT DOCUMENTS
0017532 9/1895 United Kingdom ................. 279/67

Primary Examiner—Frederick R. Schmidt
Assistant Examiner—Blynn Shideler
Attorney, Agent, or Firm—Hedman, Gibson, Costigan & Hoare

[57] ABSTRACT

A locking assembly for locking components of a machine tool together including a rotatable bar having wedges reversibly movable thereon for simultaneously engaging wedge receiving spaces of one of the tool components while a portion of the wedges are secured in corresponding space in another tool component to thereby provide full face to face interlocking engagement of the wedges and the tool components. Machine tool components interlocked with the locking assembly of the invention which may include a vibrational energy dissipating cavity are also disclosed.

13 Claims, 4 Drawing Sheets

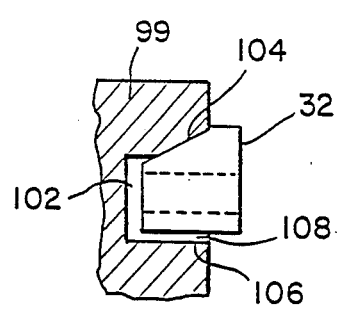
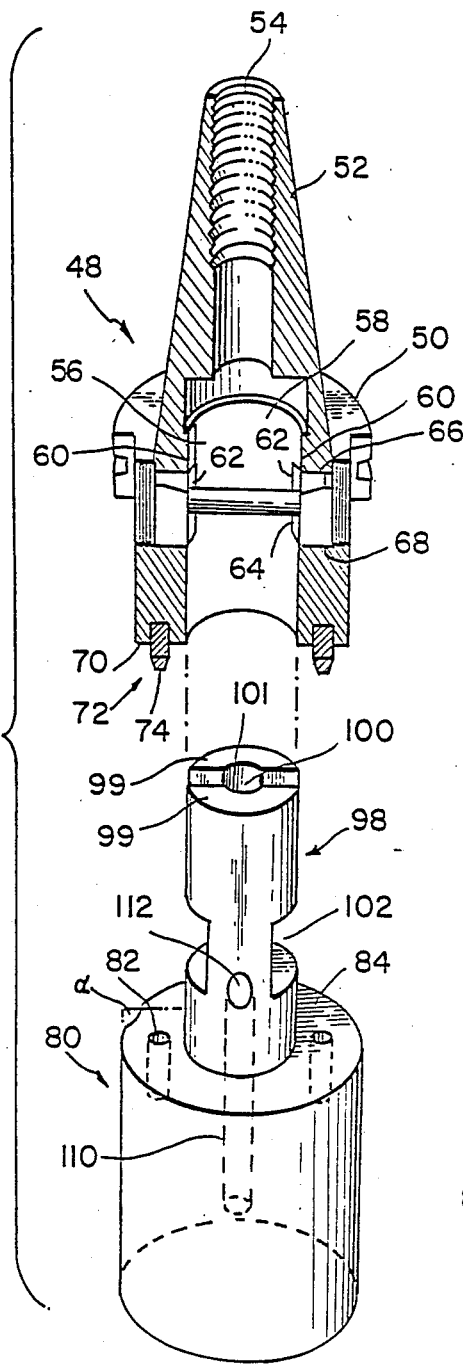
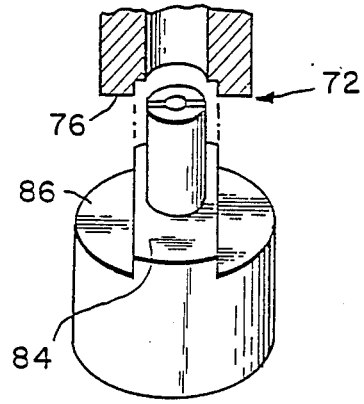

MODULAR LOCKING SYSTEM

FIELD OF THE INVENTION

The present invention is generally to a modular system for reversibly locking rigid components of a machine tool together and specifically to locking corresponding halves of a machine tool and for reducing vibration of the locked tool components during machining operations.

BACKGROUND OF THE INVENTION

Machine tool holders used for grinding, cutting and shaping workpieces have been made in a single piece construction. However, it is often time consuming and expensive to manufacture single piece tools.

As an alternative to single piece construction, it is known to manufacture the tool in two pieces and then weld corresponding faces of the two pieces together. Inertia welding is typically employed for this purpose wherein the corresponding faces are rotated in opposite directions against each other under severe pressure conditions so that the corresponding faces form a common weldment.

While such welding procedures effectively join the two tool pieces together, the procedure suffers from significant disadvantages. Specifically, inertia welding typically results in the entrapment of gases in the welded area which often leads to stress fractures and consequential tool failure. In addition, it is very difficult to machine such welds which results in significant limitations on the design of the tool.

There have been efforts to join two components of a machine tool together by methods other than welding. One such effort has been to design a tool with one component of the tool having a male projection which fits into a female cavity of the second component. Screw receiving spaces are provided at opposite sides and perpendicular to the longitudinal axis of the projection. Screws are inserted into the screw receiving spaces and turned to engage and force the tool components together.

Such methods have not been successful in providing a meaningful alternative to one piece construction and the welding of two components together. This is because the cavity and screw locking mechanism are not able to withstand the vibrational forces generated during use of the machine tool. This is due in part because such a locking mechanism provides only single line contact between the screw and the tool components and therefore is insufficient to effectively lock the two tool components together. In addition, the screws on each of the opposite sides of the projection are not locked in simultaneously. This results in less than a maximum locking force being applied to the locked tool components. Still further, there is no provision in such locked tools for alleviating the forces on the tool resulting from excessive vibration.

It is therefore an object of the invention to provide an encapsulated self-contained locking assembly by which components o a machine tool can be locked together simultaneously to maximize the locking force so that the tool is at least as strong as if it were made of a single piece construction.

It is another object of the invention to provide a locking assembly which joins the components of a machine tool together with full face to face contact of the locking members.

It is still another object of the invention to provide a locking assembly which eliminates axial misalignment and secures the components of the tool together under uniform pressure.

It is a further object of the invention to provide a machine tool component which dampens the vibrational forces acting on the tool during machining operations.

SUMMARY OF THE INVENTION

The present invention is directed to a locking assembly and to machine tools formed from corresponding components locked together by the present locking assembly.

In accordance with the invention, there is provided a locking assembly which creates both axial tension and compression on the respective components of the tool in multiple regions of contact. The locking assembly is also advantageous because it is located in the tail region of the machine tool and is therefore less susceptible to damage from machining operations and significantly less likely to be adversely affected by internal coolant flow systems which may be provided therein. Furthermore, the locking assembly of the present invention is especially strong and stable because all of the locking forces are directed toward the center of the locked machine tool, to thereby provide a denser center area.

The locking assembly includes a bar having means mounted hereon for preventing all but rotation movement of the bar. The bar is rotatable about its axis but is prevented from non-rotational movement by, for example, set screws which are located at opposite ends of the bar and secured to one of the tool components. The bar has on its opposed ends right and left hand threads or projection engaging grooves which move toward or away from each other depending on whether the bar is rotated clockwise or counterclockwise.

Mounted on the bar are a pair of diametrically opposed tool component engaging means which serve to lock the tool components together. In a preferred form of the invention, the tool component engaging means comprise wedges having at least one tool component engaging face, and preferably multiple faces for providing maximum full face contact with the tool components. Each wedge of the pair is a mirror image of the other and the wedges are movable on the bar toward each other and away from each other at precisely the same rate. The wedges have axial holes through which the bar is inserted and the holes are provided with grooves or a projection which are matable with the threads or grooves on the bar so that the wedges move in concert with each other and the rotational movement of the bar toward and away from each other to achieve the same rate of movement. This also insures that when the wedges engage the tool components, they do so simultaneously and therefore apply the identical locking force at precisely the identical moment to the tool components thereby eliminating axial misalignment of the locked tool components.

In one embodiment, the bar is provided with cam type grooves matable with a corresponding projection within the axial hole of the wedges to thereby provide a differential rate of movement of the wedge as it moves along the bar.

The present invention is also directed to a machine tool comprised of a pair of complimentary tool components which are locked together by the locking assembly of the present invention.

By way of example, in a machine tool holder for use in a lathe; one component will include a tail section which is insertable into the lathe and a second component which contains a cutting insert assembly including a cutting insert for machining a workpiece.

The tail section includes a grooved bore which mates with a threaded projection from the lathe to secure the tool holder therein. Within the tail section is a cavity for receiving a stem of a second tool component. The tail section also includes opposed chambers for receiving and securing the locking assembly of the invention. The set screws of the locking assembly which are employed to prevent all but rotational movement of the bar are fixedly attached to the tail section within grooves at opposed ends of the respective chambers. The set screws thereby effectively encapsulate the bar enabling the bar to rotate but prevent movement in any other manner.

The tail section also includes a second cavity which is continguous with the stem receiving cavity and which is used to dissipate vibrational energy of the tool during machining operations. The vibrational dampening cavity may have a larger cross-sectional area than the stem receiving cavity to accomodate radial expansion of the stem when it is subjected to tee axial tension and compression generated by the locking assembly.

The component of the machine containing the cutting insert assembly includes the stem which is insertable into the stem receiving cavity of the tail section. The stem has a slot therein along its longitudinal axis with an opening for receiving the bar of the locking assembly. The slot is formed by a pair of legs which are adapted to resonate in response to vibrational energy.

The resonance of the legs produces sound waves which are dissipated in the vibrational dampening cavity of the tail section of the tool holder when the locked components are subjected to vibrational energy during machining operations.

The stem of the cutting insert section also includes a pair of wedge receiving spaces. These spaces are alignable with the respective wedge receiving chambers is the tail section. This enables the wedges of the locking assembly to move along the bar from the unlocked position wherein the wedges are substantially in the chambers to the locked position whereby the wedges simultaneously engage wedge engaging faces in the wedge receiving spaces of the stem to thereby lock the two components of the tool holder together.

The stem spaces are designed to provide corresponding wedge bearing faces so that when the wedges are inserted therein at leas two faces of the wedges are in full face to face contact with corresponding faces of the stem spaces to provide maximum axial tension and compression between the tool components when they are locked together.

In a preferred form of the invention, the wedges include a forward and rearward face and an upwardly tapered bearing face extending from the forward end and terminating before the rear termination point to the rearward end is an essentially non-tapered bearing face. The tapered face is in full face to face contact with a corresponding face of the wedge receiving space of the stem. At the same time, the non-tapered face is in full face to face contact with a corresponding face of the wedge receiving chamber in the tail section to provide a secure locked in condition between the tool components under maximum axial tension and compression. In addition, a portion of the side faces of the wedges ma be tapered inwardly at the bottom to provide additional bearing faces for engaging corresponding faces in the wedge receiving chamber.

The tool components may be rotationally orientated while locking and unlocking the locking assembly of the invention by providing the front end of the tail section with a male projection which is insertable into a female cavity within the base of the other tool component of the machine tool. The desired object can be obtained by using at least one dowel pin fastened to the tail section which is insertable into a dowel pin receiving hole within the other tool component. Similarly, the tail section can be provided with a raised ridge which is insertable into a complimentary slot within the base of the other tool component to accomplish the same purpose.

In operation, the tail section having the locking assembly set in the opposed wedge receiving chambers is aligned with the cutting insert component of the tool holder by inserting the stem into the stem receiving cavity. This simultaneously causes the legs of the stem to move upwardly along each side of the bar. In this fully inserted position, the wedge receiving chambers in the tail section are aligned with the wedge receiving spaces in the stem.

The tool components are then locked in place by rotating the bar so that the right and left handed threads or grooves on the bar engage the mating grooves or projections on the respective wedge and move the wedges toward each other until the wedges are simultaneously secured in the respective wedge receiving spaces of the stem. To disengage the wedges, the bar is rotated in the opposite direction and the wedges are thereby moved backward until they reside solely in the respective chambers of the tail section in the unlocked position. The stem of the cutting assembly section of the tool can then be disengaged from the tail section by lowering the cutting insert assembly section until the bar of the locking assembly is raised out of the slot of the stem.

BRIEF DESCRIPTION OF THE DRAWINGS

The following drawings in which like reference characters indicate like parts are illustrative of embodiments of the invention and are not intended to limit the scope of the invention as set forth in the claims forming part of the application.

FIG. 5 is an exploded partial sectional view showing the locking assembly in the tail section of the tool holder and the cutting insert component ready to be engaged before locking;

FIG. 6 is a cross-sectional view of the wedge receiving space in the stem of the cutting insert component with a wedge set therein;

FIG. 7 is a partial perspective view of the embodiment of the rotational orientation means for radially aligning the tool components prior to activating the locking assembly;

DETAILED DESCRIPTION OF THE INVENTION

Figure 1A:
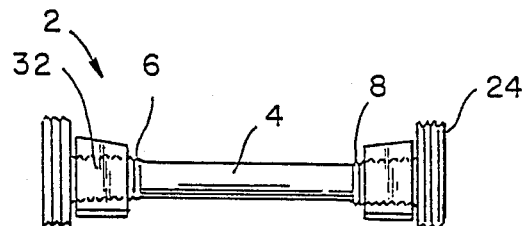
FIG. 1A is a perspective view of the locking mechanism of the present invention showing wedges in the disengaged position wherein the bar can be inserted into a slot provided in one of the tool components.

Referring to the drawings, and particularly to FIGS. 1A, 1B, 2-4, the present invention is directed to a locking assembly 2 which includes a bar 4 having at opposed ends thereof left handed threads 6 and right handed threads 8. The threads 6 and 8 may be reversed as long as left handed threads 6 and right handed threads 8 are on opposite sides of the bar 4.

Figure 4:
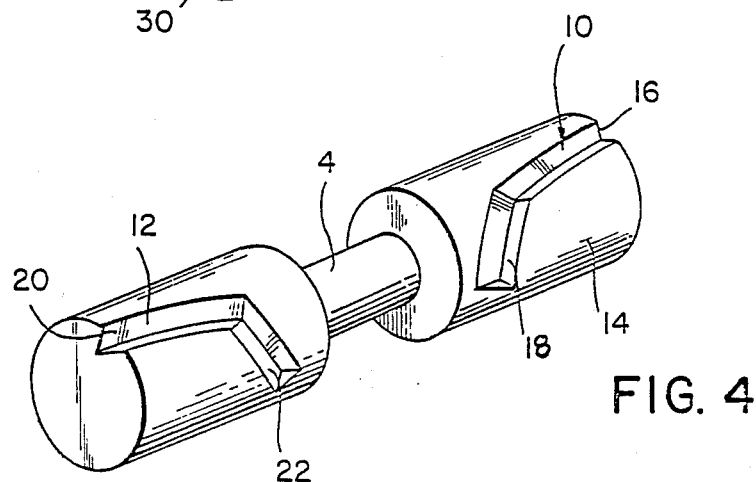
FIG. 4 is a perspective view of another embodiment of the locking mechanism of the invention.

As shown in FIG. 4, threads 6 and 8 may be replaced by cam grooves 10 and 12 formed within the bar 4 itself or in a radially enlarged segment 14 thereof. The grooves 10 and 12 contain respective pairs of pathways 16, 18 and 20, 22 which are angled with respect to each other to thereby alter the rate of movement of the wedges mounted thereon as explained in detail hereinafter.

Figure 1B:
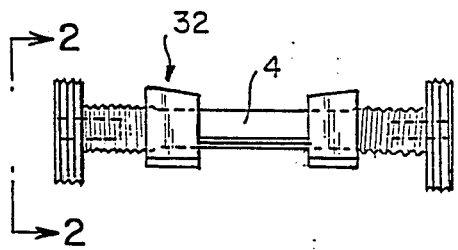
FIG. 1B is a perspective view similar to FIG. 1A showing the wedges moved toward each other and in position for locking the tool components together.
Figure 2:
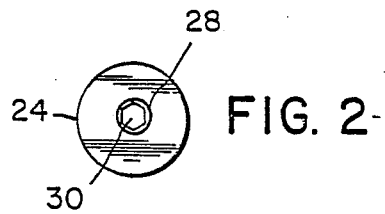
FIG. 2 is a front view taken through line 2—2 of FIG. 1B showing the manner in which the bar may be rotated to move the wedges toward or away from each other.

The remote ends of the bar 4 have thereon set screws 24 having threads 26 which are secured in one of the components of the machine tool holder as described hereinafter. The set screws 24 are also provided with an axial hole 28 in which rests the bar 4. As shown in FIGS. 1B and 2, a hexagonal hole 30 extends from one end of the bar 4 inwardly into the bar 4. When the hexagonal hole 30 is engaged by a hex wrench and the hex wrench is rotated, the bar 4 will likewise rotate between the set screws 24. While the bar 4 may be rotated by rotating a hex wrench within just one of the hexagonal holes 30, it is desirable to have both set screws 24 fitted with axial holes 28 to enable operation of the locking assembly from either side of the tool holder for greater locking and unlocking strength and flexability.

Figure 3:
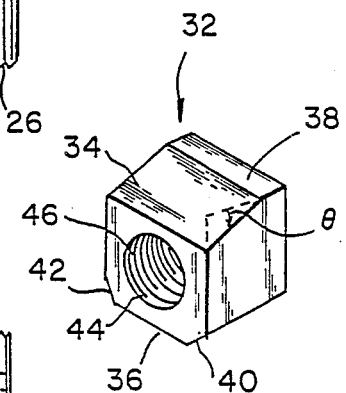
FIG. 3 is a front view of a wedge showing multiple bearing faces.

On the bar 4 are a pair of diametrically opposed wedges 32 having top tapered bearing faces 34 and bottom bearing faces 36. Substantially flat top bearing faces 38 are also provided. Inward tapered side bearing faces 40 and 42 may also be provided as shown in FIG. 3.

Bearing faces 34 are designed to engage a wedge receiving chamber in one of the components of the tool. Top flat bearing faces 38 and optional inward tapered side bearing faces 40 and 42 are adapted to engage corresponding bearing faces in the wedge receiving chambers in the other tool component of the tool holder as described i detail hereinafter.

The wedges 32 have axial holes 44 with grooves 46 therein which are matable with the respective left and right handed threads 6 and 8 on the bar 4 so that upon turning the bar 4, the wedges 32 move toward or away from each other.

As shown in FIG. 4, the threads 6 and 8 may be replaced by grooves 10 and 12 and the axial hole 44 of the wedge 32 provided with a complimentary projection that is slidable within the cam grooves 10 and 12 thereby providing movement of the wedge 32 along the bar 4.

The grooves 10 and 12 may be designed with a plurality of pathways angled with respect to each other to thereby moderate the rate of speed of the wedge 32 along the bar 4. However, grooves 10 and 12 must be mirror images of each other to insure that the wedges 32 lock the tool components together simultaneously.

The locking assembly 2 is adapted to be inserted in and lock complimentary components of a tool holder Referring to FIG. 5, as an example of a two piece tool holder, a first tool component 48 of a machine tool holder includes a base 50 and a tapered tail section 52 having a threaded bore 54 for mating with a threaded projection from a lathe (not shown) to secure the machine tool holder therein.

Figures 8, 9:
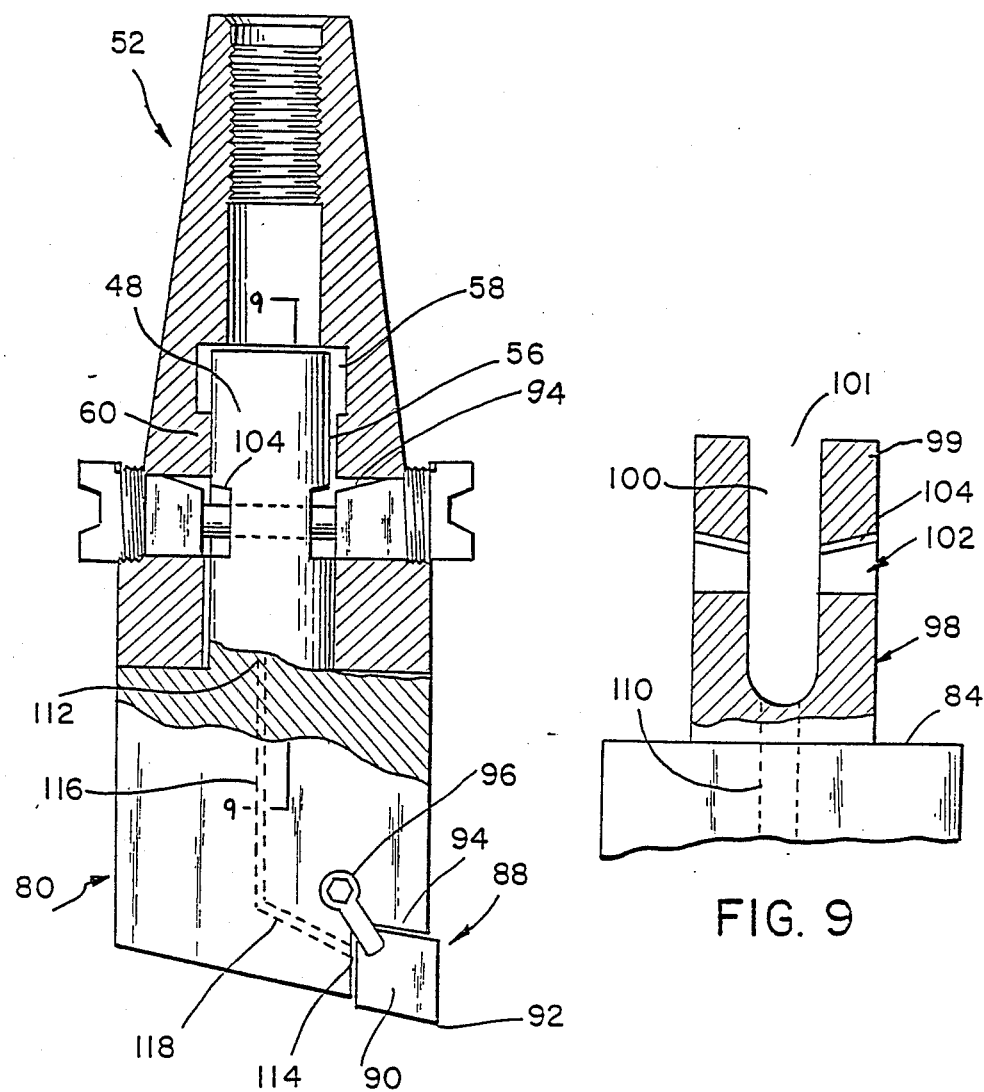
FIG. 8 is a partial cross-sectional view of the two components of the machine tool holder fitted together before locking by the locking assembly of the present invention.
FIG. 9 is a partial cross-sectional view of the relative position of the stem legs when the locking mechanism is in the unlocked position.

The first tool component 48 also includes a stem receiving cavity 56 for receiving a second tool component. A vibration dampening cavity 58 as best seen in FIG. 8 is also provided between the stem receiving cavity 56 and the bore 54.

The vibration dampening cavity 58 has a cross-sectional area greater than the cross-sectional area of the stem receiving cavity 56 to provide room for radial expansion of the stem when the tool components are locked together and begin to disseminate the vibrational forces generated during machining operations.

The stem receiving cavity 56 is formed by walls 60 having therein opposed wedge receiving chambers 62. The wedge receiving chambers 62 have an opening 64 which permits the respective wedges 32 to enter and exit. The chambers 62 are defined by upper walls 66 and bottom walls 68. The height of the chambers 62 measured from walls 66 to walls 68 is sufficient to provide clearance for relative radial movement of the wedges 32. When the wedges 32 are in the tool engaging position, upper walls 66 engage the top flat faces 38 of the wedges 32. It is also within the scope of the invention to provide complimentary walls in the chambers 62 to engage the respective inwardly tapered side faces 40 and 42 of the wedges 32.

The base 50 of the first tool component 48 has a bottom face 70 which bears against the second tool component 80 when the respective tool components are locked together. The bottom face 70 may be provided with rotational orientation means 72 which, in one embodiment may be at least two dowel pins 74 which are insertable into corresponding cavities 82 on the top face 84 of the second tool component 80 to provide means of radially positioning the tool components together prior to locking.

In another embodiment as shown in FIG. 7, the rotational orientation means 72 may be in the form of a ridge 76 which is slidable onto a corresponding platform 86 in the top face 84 of the second tool component 80.

As shown in FIG. 8, the second tool component 80 includes a cutting insert assembly 88 which typically includes a cutting insert 90 having a cutting edge 92 which is secured within a recess 94 by any of a number of securing means such as a clamp 96.

At the opposed end of the second tool component 80 at the top face 84 is a stem 98 depending upwardly therefrom as shown in FIG. 5. The stem 98 includes a pair of legs 99 defining a slot 100 having an opening 101 for receiving the bar 4 of the locking assembly 2. The stem 98 is also provided with wedge receiving spaces 102. The second tool component 80 shown in FIG. 5 is shown as a cylindrical block which is to be machined and fitted with a cutting insert assembly 88 as shown in FIG. 8.

Referring to FIG. 6, one wedge receiving space 102 is shown in engagement with one wedge 32. The wedge receiving space 102 includes a bearing face 104 which is angled to the same degree as the top tapered face 34 of the wedge 32. The length of the wedge tapered face 34 is preferably greater than the length of the bearing face 104 so as to prevent deformation of the geometry of the wedge receiving space 102 during locking engagement.

The wedge receiving space 102 has a bottom face 106. Between the bottom face 106 and the bottom face 36 of the wedge 32 is a gap 108 when the wedge 32 is in locking engagement within the wedge receiving space 102. More specifically, locking engagement is provided by the pressure contact of tapered wedge face 34 against the corresponding tapered bearing face 104 of the wedge receiving space 102 and the pressure contact of the bottom flat face 36 of the wedge 32 against tee bottom wall 68 of the wedge receiving chamber 62 in the first tool component 48.

As previously indicated in reference to FIG. 3, additional bearing faces 40 and 42 may be added to the wedge 32 and the wedge receiving spaces 102 accordingly modified to provide complimentary faces.

As shown in FIGS. 5 and 8, the machine tool holder of the invention may also be provided with an internal coolant system 110 for the flow of coolant through the second tool component 80 via entry port 112 and exit port 114. The coolant is injected from a source (not shown) into entry port 112 and down a first pathway 116 into a contiguous second pathway 11 and out the exit port 114 onto the cutting insert assembly 88.

A decided advantage of the present invention is that the locking assembly 2 is positioned in the first tool component 48 remote from the coolant flow thereby minimizing the likelihood that the locking assembly 2 will breakdown due to the build-up of dried residual coolant. The entry port 112 may be located at any convenient location in the second tool component 80 including the base of the slot 100.

In operation as shown particularly in FIGS. 5-7, 8 and 10, the first and second tool components 48 and 80 are first oriented by inserting dowel pins 74 into dowel pin receiving cavities 82 or by alignment of ridges 76 with the platform 86 of the second tool component 80. The bar 4 is rotated so that the wedges 32 are moved away from each other until they are entirely in the wedge receiving chambers 62 of the first tool component 48. The wedges 32 are moved by the interaction of the threads 6 and 8 with the grooves 46 in the hole 44 or by a projection within the hole 44 and the cam grooves 10 and 12 as shown in FIG. 4.

The stem 98 of the second tool component 80 is then inserted into the stem receiving cavity 56 and moved upward so that the legs 99 slide along the sides of the bar 4 until the stem 98 is fully inserted into the cavity 56.

At this point, the chambers 62 containing the respective wedges 32 are aligned with the wedge receiving spaces 102 within the legs 99 of the stem 98 as shown in FIG. 8.

Figures 10, 11:
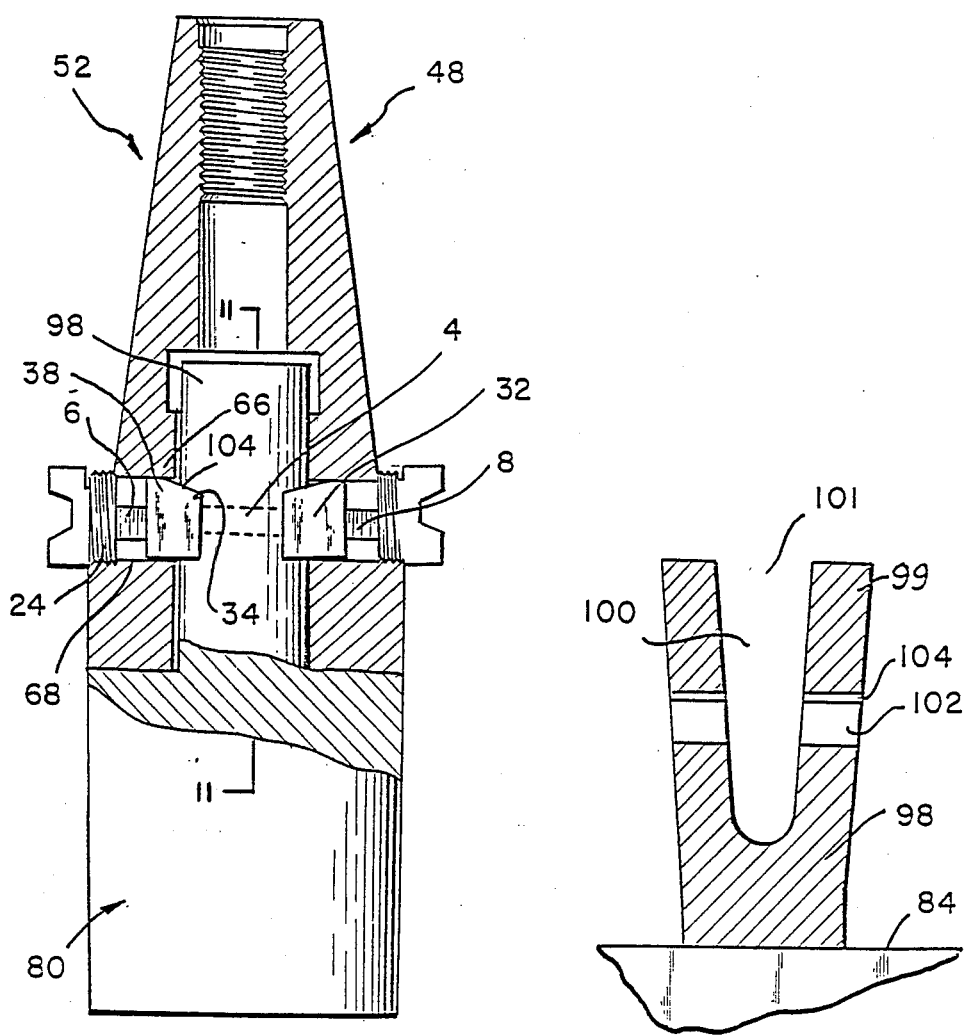
FIG. 10 is a partial cross-sectional view of the two components of the machine tool holder fitted together and locked by the locking assembly of the present invention.
FIG. 11 is a partial cross-sectional view of the stem showing radial expansion of the stem legs when subjected to axial tension from operation of the locking assembly.

The tool components 48 and 80 are then locked together by rotating the bar 4 (see FIG. 2) so that the threads 6 and 8 or cam grooves 10 and 12 on the bar 4 rotate toward each other thereby causing the wedges 32 to move toward each other and simultaneously enter the wedge receiving spaces 102 of the stem 98 at precisely the identical moment as shown in FIG. 10.

Rotation of the bar 4 is terminated when the bearing faces 34 of the wedges 32 are fully secured and bear against the corresponding bearing faces 104 of the wedge receiving space 102 and the bottom walls 68 of the wedge receiving chambers 62 bear against the bottom faces 36 of the wedges 32 thereby providing full face to face contact between the stem 98 of the second tool component 80 and the wedge receiving chambers 62 of the first tool component 48.

As previously indicated, the tail section 52 of the first tool component 48 is also provided with a vibration dampening cavity 58 which has a larger cross-sectional area than the contiguous stem receiving cavity 56.

The dampening of vibrational energy in accordance with the present invention is accomplished as follows. Vibrational energy is reduced in the present invention due to the compression of the faces 34 and 38 of the wedges 32 on the corresponding faces 104 of the wedge receiving spaces 102 and the upper walls 66 of the wedge receiving chambers 62 which thereby induce axial tension on the stem 78 which causes the legs 99 to bend outwardly from the position shown in FIG. 9 to the position shown in FIG. 11. The vibrational energy which does exist during machining operations is disseminated in part due to the axial tension of the locked components created by the precise and simultaneous locking of the diametrically opposed wedges 32 at the center of the stem 98 which substantially eliminates cocking or shifting of the tool components 48 and 80. As a result, the legs 99 act as tuning forks and are capable of disseminating the vibration energy as sound waves which are dissipated in the vibration dampening cavity 58 without causing vibration of the tool components per se.

The wedges 32 employed in the locking assembly 2 of the present invention employ a wedge angle $\theta$ (see FIG. 3) of no more than 45°, preferably 15° or less and most desirably about 7° to provide the desired simultaneous self-locking tension effect. The wedges 32 provide as many as seven full face to face bearing faces to insure the desired axial tension compression between the respective tool components.

The stem 98 of the second tool component 80 undergoes significant axial tension when locked to the first tool component 48. Accordingly, the top face 84 is preferably made at an angle which is non-perpendicular to the axis of the stem 98 so as to facilitate any distortion of the top face 84 under such axial tension. The non-perpendicular angle $\alpha$ as shown in FIG. 5 is typically from about 89.5 to about 89.75 degrees.

When the wedges 32 simultaneously engage the wedge receiving spaces 102 of the stem 98 there results a straight axial pullback of the first tool component 48 and the stem 98 into the stem receiving cavity 56.

This effect results in a force sufficient to induce an axial tension on the stem 98 thus causing extreme axial compression between the top face 84 of the second tool component 80 and the bottom face 70 of the first tool component 48 (See FIG. 5) or between the platform 86 and the ridge 76 as shown in FIG. 7.

It is this combination of tension in the stem and compression in the bearing faces which results in the change of angle α from less than 90° (See FIG. 5) to about a 90° angle. The combination of axial tension and compression also results in the divibratory benefits described above as well as the rigid interlocking of the tool components.

I claim:

1. A machine tool formed from a pair of interlocked components comprising:
  (a) a locking assembly comprising;
    a bar,
    means associated with the bar for preventing all but rotational movement of the bar,
    a pair of opposed tool component engaging means mounted on the bar and having at least two opposed bearing faces, and means for reversibly moving the pair of engaging means into simultaneous engagement with a first and a second tool component,
  (b) a first tool component comprising;
    a base,
    a stem integral with the base having a pair of substantially parallel legs and a slot therebetween for receiving the bar of the locking assembly, said stem including a pair of opposed first spaces for engaging by pressure contact at least one of the opposed bearing faces of said tool component engaging means when the first component is locked to the second component,
  (c) a second tool component comprising;
    a first cavity for receiving the step of the first tool component,
    a pair of opposed second spaces for engaging by pressure contact the other of said opposed bearing faces of said tool component engaging means, and a second cavity contiguous with said first cavity for disseminating vibrational energy given off by the legs of the stem of the first tool component, wherein said tool component engaging means is movable from a tool disengaged position within the second spaces to a tool engaging position wherein a portion of the tool engaging means is within the first space of the stem and said bearing face engages a wall of the first space and the remaining portion of the tool engaging means is within the second space of the second tool component wherein said opposed bearing face engages a wall of the second space to thereby exert axial compression between the first and second tool components and axial tension on the legs of the stem when the first and second tool components are locked together.

2. The machine tool of claim 1, wherein the cross-sectional area of the second cavity is greater than the first cavity.

3. The machine tool of claim 1, wherein the motion preventing means comprises a pair of set screws circumscribing opposed ends of said bar.

4. The machine tool of claim 1 wherein the tool engaging means comprises wedges having a front face having an axial hole therein for engaging the bar, a rear face, an upwardly tapered face extending form the front face and terminating at a point before the rear face, a substantially flat face extending from the termination point to the rear face, and a bottom face, said upwardly tapered face engaging a corresponding face of said opposed first spaces of the step of the first tool component and said bottom face engaging a corresponding face of the opposed second spaces of the second tool component.

5. The machine tool of claim 4, wherein the upwardly tapered face of the wedge has an angle of taper of up to 45°.

6. The machine tool of claim 1 wherein said parallel legs are adapted to bend outwardly away from each other as the result of the axial tension applied to the seam when the tool components are locked together.

7. The machine tool of claim 5 wherein the angle of taper is up to 15°.

8. The machine tool of claim 4 wherein the wedges further comprise a bottom face and a pair of opposed side faces, a portion of said side faces being tapered inwardly toward the bottom face.

9. The machine tool of claim 1 further comprising means for rotationally orientating said first and second tool components.

10. The machine tool of claim 1 wherein the base of the first tool component has a top surface and wherein the longitudinal axis of the stem is not perpendicular to the top surface of the base when the tool components are in the unlocked position.

11. The machine tool of claim 10 wherein when the first and second tool components are locked together the longitudinal axis of the stem and the top surface of the base are essentially perpendicular to each other.

12. The machine tool of claim 11, wherein the reversible moving means comprises:
  (a) grooves or threads on opposed portions of said bar for engaging said respective tool engaging means;
  (b) means for rotating the bar in a first direction to thereby cause rotational movement of the grooves or threads which thereby simultaneously move said tool engaging means into locking engagement with the machine components and for rotating said grooves or threads in the opposite direction to thereby simultaneously disengage said tool engaging means from said machine components.

13. The machine tool of claim 12 wherein each bar has a non-linear groove, said engaging means moving into simultaneous engagement with the first and second tool components along said non-linear groove.

* * * * *

UNITED STATES PATENT AND TRADEMARK OFFICE
CERTIFICATE OF CORRECTION

PATENT NO.   :  4,829,862

DATED        :  May 16, 1989

INVENTOR(S)  :  George Keritsis

It is certified that error appears in the above-identified patent and that said Letters Patent is hereby corrected as shown below:

Column 9, line 38, "step" should read -- stem --.

Signed and Sealed this

Third Day of April, 1990

Attest:

HARRY F. MANBECK, JR.

*Attesting Officer*    Commissioner of Patents and Trademarks